US012422298B2

(12) United States Patent
Blomberg et al.

(10) Patent No.: US 12,422,298 B2
(45) Date of Patent: Sep. 23, 2025

(54) RADAR LEVEL GAUGE SYSTEM AND METHOD WITH IMPROVED FILLING LEVEL DETERMINATION

(71) Applicant: Rosemount Tank Radar AB, Mölnlycke (SE)

(72) Inventors: Urban Blomberg, Linköping (SE); Lars-Ove Larsson, Linköping (SE)

(73) Assignee: ROSEMOUNT TANK RADAR AB, Mölnlycke (SE)

( * ) Notice: Subject to any disclaimer, the term of this patent is extended or adjusted under 35 U.S.C. 154(b) by 401 days.

(21) Appl. No.: 17/947,460

(22) Filed: Sep. 19, 2022

(65) Prior Publication Data

US 2023/0095448 A1 Mar. 30, 2023

(30) Foreign Application Priority Data

Sep. 30, 2021 (EP) .................... 21200244

(51) Int. Cl.
*G01F 23/80* (2022.01)
*G01F 23/284* (2006.01)

(52) U.S. Cl.
CPC .......... *G01F 23/802* (2022.01); *G01F 23/284* (2013.01)

(58) Field of Classification Search
CPC ...... G01F 23/802; G01F 23/284; G01S 7/356; G01S 13/584; G01S 13/588; G01S 13/88
See application file for complete search history.

(56) References Cited

U.S. PATENT DOCUMENTS 10,775,221 B2 * 9/2020 Blomberg ............... G01S 7/354
10,816,385 B2 * 10/2020 Blomberg ............. G01F 23/284
2006/0137446 A1 * 6/2006 Wennerberg .......... G01F 23/284
73/290 V
2014/0028492 A1 1/2014 Mayer et al.
2015/0101405 A1 4/2015 Gorenflo et al.
2015/0192449 A1 * 7/2015 Malinovskiy, I ..... G01F 23/296
342/124

(Continued)

FOREIGN PATENT DOCUMENTS

DE 10 2019 216879 4/2021

OTHER PUBLICATIONS

Extended European Search Report from European Patent Application No. 21200244.8, dated Mar. 22, 2022.

*Primary Examiner* — Bernarr E Gregory
*Assistant Examiner* — Yonghong Li
(74) *Attorney, Agent, or Firm* — Westman, Champlin & Koehler, P.A.

(57) ABSTRACT

A method of determining a filling level of a product in a tank using a radar level gauge system comprising a transceiver, an antenna, and processing circuitry, the method comprising the steps of: generating and transmitting a transmit signal; receiving a reflection signal resulting from reflection of the transmit signal; determining based on the transmit signal and the reflection signal, for each surface echo candidate, a first measure indicative of a distance and a second measure indicating a rate-of-change distribution of the distance; assigning one surface echo candidate as most likely to correspond to single reflection of the transmit signal at the surface of the product, based on an evaluation of the second measure for each surface echo candidate; and determining the filling level based on the first measure for the assigned surface echo candidate.

13 Claims, 6 Drawing Sheets

(56) References Cited

U.S. PATENT DOCUMENTS

2017/0176236 A1 6/2017 Corbe et al.
2019/0368912 A1* 12/2019 Welle ................... G01F 23/284
2019/0390997 A1 12/2019 Blomberg et al.

* cited by examiner

RADAR LEVEL GAUGE SYSTEM AND METHOD WITH IMPROVED FILLING LEVEL DETERMINATION

CROSS-REFERENCE TO RELATED APPLICATION

This application claims priority to European Patent Application No. 21200244.8, filed Sep. 30, 2021, the content of which is hereby incorporated by reference in its entirety.

TECHNICAL FIELD OF THE INVENTION

The present invention relates to a radar level gauge system and method, for determining a filling level of a product in a tank.

TECHNICAL BACKGROUND

Non-contact filling level determination technologies are advantageously used for determining the filling level of product in tanks in various applications. For instance, non-contact radar level gauges are very well suited for use in various process tanks with agitators used for blending fluids or solids etc. When determining the filling level in a tank using a non-contact radar level gauge system, an electromagnetic transmit signal is radiated towards the product in the tank, and it is received a reflection signal resulting from reflection of the transmit signal at the surface and any other reflecting object in the tank. The reflection signal may thus, for example, include contributions from reflection of the transmit signal at beams, ladders, holders, agitators, heaters etc. Additionally, the reflection signal may include contributions resulting from multiple reflections between the any reflecting object in the tank and the antenna.

Each contribution to the reflection signal may be referred to as a surface echo candidate, and to be able to determine the filling level, one of the surface echo candidates needs to be assigned as most likely to correspond to (a single) reflection of the transmit signal at the surface of the product.

For reliable non-contact filling level determination, it is thus important to reliably assign one of the surface echo candidates as most likely to correspond to (a single) reflection of the transmit signal at the surface of the product.

Various possible criteria for this assignment exist, and include, for example, one or several of amplitude, polarity and level rate-of-change of the surface echo candidates.

It would, however, be desirable to further improve the reliability of the assignment of one of the surface echo candidates as most likely to correspond to (a single) reflection of the transmit signal at the surface of the product in a non-contacting radar level gauge system.

SUMMARY OF THE INVENTION

In view of the above, a general object of the present invention is to provide for improved filling level determination, and in particular to provide for further improved reliability of the assignment of one of the surface echo candidates as most likely to correspond to reflection of the transmit signal at the surface of the product in a non-contacting radar level gauge system.

According to a first aspect of the present invention, it is therefore provided a method of determining a filling level of a product in a tank using a radar level gauge system comprising a transceiver, an antenna, and processing circuitry, the method comprising the steps of: generating and transmitting, by the transceiver, an electromagnetic transmit signal; radiating, by the antenna, the transmit signal towards the product in the tank; returning, by the antenna, an electromagnetic reflection signal resulting from reflection of the transmit signal back towards the transceiver; determining, by the processing circuitry, based on the transmit signal and the reflection signal, for each surface echo candidate in a set of surface echo candidates, a first measure for the surface echo candidate indicative of a distance between the antenna and a surface candidate corresponding to the surface echo candidate and a second measure for the surface echo candidate indicating a rate-of-change distribution of the distance between the antenna and the surface candidate corresponding to the surface echo candidate; assigning one surface echo candidate in the set of surface echo candidates as most likely to correspond to single reflection of the transmit signal at the surface of the product, based on an evaluation of the second measure for each surface echo candidate in the set of surface echo candidates; and determining the filling level based on the first measure for the surface echo candidate assigned as most likely to correspond to reflection of the transmit signal at the surface of the product.

By the term "surface echo candidate" should be understood a representation that indicates reflection of the transmit signal at an object that may or may not be the surface of the product in the tank. For instance, as is well-known in the art, the transmit signal may be reflected from one or more fixed objects in the tank, which will result in one or more surface echo candidates that should not be assigned as most likely to correspond to a single reflection of the transmit signal at the surface of the product.

The first measure indicative of the distance between the antenna and a surface candidate may be any measure from which the distance can be deduced. For instance, the first measure may be indicative of a travel time for the transmit signal from the transceiver, to the surface candidate, and back to the transceiver.

As was mentioned in the Background section, it should be noted that the assigning of one surface echo candidate in the set of surface echo candidates as most likely to correspond to a single reflection of the transmit signal at the surface of the product may additionally be based on an evaluation of additional measures, as is per se known to the person skilled in the relevant art.

The present invention is based on the realization that evaluation, for each surface echo candidate, of the second measure indicating a rate-of-change distribution of the distance between the antenna and the surface candidate corresponding to that surface echo candidate, may provide important input for a more reliable identification of the surface echo candidate that corresponds to a single reflection of the transmit signal at the surface of the product.

The rate-of-change distribution of the distance between the antenna and a surface candidate provides information about the speed distribution within the area radiated by the antenna for that surface candidate. A fixed structure will exhibit a very narrow speed distribution. A surface of a disturbed liquid will, however, exhibit a rather broad speed distribution, because it will typically at every instant have surface portions, within the area of the surface that is "visible" to the antenna, that are moving towards the antenna and other surface portions that are moving away from the antenna. Through an evaluation of the second measure indicating a rate-of-change distribution of the distance between the antenna and the surface candidates, a surface echo candidate corresponding to the surface of a disturbed liquid can thus reliably be distinguished from a surface echo candidate corresponding to a fixed structure in the tank.

In this context it should be noted that the reflected energy captured by the antenna from reflection of the transmit signal at the surface of a disturbed liquid product is typically considerably lower, such as ten times lower, than from reflection at the surface of an undisturbed liquid product. This effect makes it more difficult to correctly identify the surface of the product using known methods.

The liquid product in the tank may, for example, be disturbed by user-controlled actions, such as stirring or filling or emptying of the tank. Thus, the method according to embodiments of the present invention may advantageously be carried out at times when it is known that the liquid product in the tank is being disturbed. The identification of the surface echo candidate most likely to correspond to single reflection of the transmit signal at the surface of the product achieved at such times will facilitate correct and reliable identification of that surface echo candidate also at subsequent times when the liquid product is not disturbed.

According to a second aspect of the present invention, it is provided a radar level gauge system, for determining a filling level of a product in a tank, the radar level gauge system comprising: a transceiver for generating, transmitting, and receiving electromagnetic signals; an antenna coupled to the transceiver and configured to radiate an electromagnetic transmit signal from the transceiver towards the product in the tank, and return an electromagnetic reflection signal resulting from reflection of the transmit signal back towards the transceiver; and processing circuitry coupled to the transceiver for determining the filling level based on a timing relation between the reflection signal and the transmit signal, the processing circuitry being configured to: determine, based on the transmit signal and the reflection signal, for each surface echo candidate in a set of surface echo candidates, a first measure for the surface echo candidate indicative of a distance between the antenna and a surface candidate corresponding to the surface echo candidate and a second measure for the surface echo candidate indicating a rate-of-change distribution of the distance between the antenna and the surface candidate corresponding to the surface echo candidate; assign one surface echo candidate in the set of surface echo candidates as most likely to correspond to single reflection of the transmit signal at the surface of the product, based on an evaluation of the second measure for each surface echo candidate in the set of surface echo candidates; and determine the filling level based on the first measure for the surface echo candidate assigned as most likely to correspond to reflection of the transmit signal at the surface of the product.

The "transceiver" may be one functional unit capable of transmitting and receiving microwave signals, or may be a system comprising separate transmitter and receiver units. For all embodiments, it should be noted that the processing circuitry may be provided as one device or several devices working together.

In summary, the present invention thus relates to a method of determining a filling level of a product in a tank using a radar level gauge system comprising a transceiver, an antenna, and processing circuitry, the method comprising the steps of: generating and transmitting a transmit signal; receiving a reflection signal resulting from reflection of the transmit signal; determining based on the transmit signal and the reflection signal, for each surface echo candidate, a first measure indicative of a distance and a second measure indicating a rate-of-change distribution of the distance; assigning one surface echo candidate as most likely to correspond to single reflection of the transmit signal at the surface of the product, based on an evaluation of the second measure for each surface echo candidate; and determining the filling level based on the first measure for the assigned surface echo candidate.

BRIEF DESCRIPTION OF THE DRAWINGS

These and other aspects of the present invention will now be described in more detail, with reference to the appended drawings showing a currently preferred embodiment of the invention, wherein.

DETAILED DESCRIPTION OF EXAMPLE EMBODIMENTS OF THE INVENTION

Figure 1A:
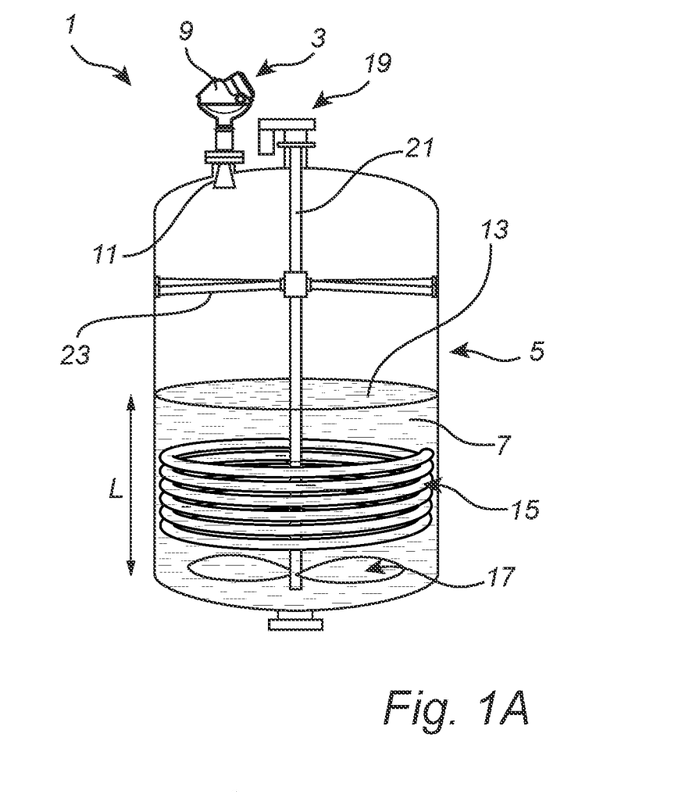
FIG. 1A schematically illustrates an exemplary tank arrangement comprising a radar level gauge system according to an embodiment of the present invention.

FIG. 1A schematically shows an exemplary tank arrangement 1 comprising a radar level gauge system 3 according to an example embodiment of the present invention, and a tank 5, such as a reactor vessel.

The radar level gauge system 3 is installed to measure the filling level of a product 7, in this case a liquid product, in the tank 5. The radar level gauge system 3 comprises a measuring electronics unit 9 arranged outside the tank 5, and a radiating antenna 11, here in the form of a horn antenna, arranged inside the tank 5.

As is schematically illustrated in FIG. 1A, the tank 5 is provided with various auxiliary equipment, in this case including a heater 15 and a stirrer 17 for inducing motion in the product 7. In the exemplary configuration of FIG. 1A, the stirrer 17 is operated by a driving arrangement 19 arranged at the top of the tank 5, and the axle 21 of the stirrer 17 is supported by struts 23 inside the tank 5.

By analyzing a timing relation between an electromagnetic transmit signal $S_T$ being radiated by the antenna 11 towards the surface 13 of the product 7, and an electromagnetic reflection signal $S_R$ resulting from reflection of the transmit signal $S_T$ at the surface 13, the measurement electronics unit 9 can determine the distance between a reference position (such as a feed-through between the outside and the inside of the tank 5) and the surface 13 of the product 7, whereby the filling level L can be deduced.

However, as will be explained in greater detail further below, the transmit signal $S_T$ is not only reflected by the surface 13 of the product 7, but also by, for example, the struts 23 supporting the axle 21 of the stirrer 17, and other microwave reflecting objects that may be present in the tank 5. In addition, there may be multiple reflections between the surface 13 and/or objects in the tank 5 and the antenna 11. There may also be reflections of signals that hit the wall of the tank 5 before and/or after hitting the surface 13, and/or at the end of a so-called nozzle, etc. Regarding multiple reflections, it has been found that they may actually appear as stronger echoes than that resulting from single reflection at the surface 13, due to a common implementation of gain compensation for echo signals that appear to result from more distant reflections. Accordingly, the reflection signal $S_R$ may contain signal components indicative of several reflections, and the analysis of the timing relation between the transmit signal $S_T$ and the reflection signal $S_R$ may result in a plurality of surface echo candidates.

Figure 1B:
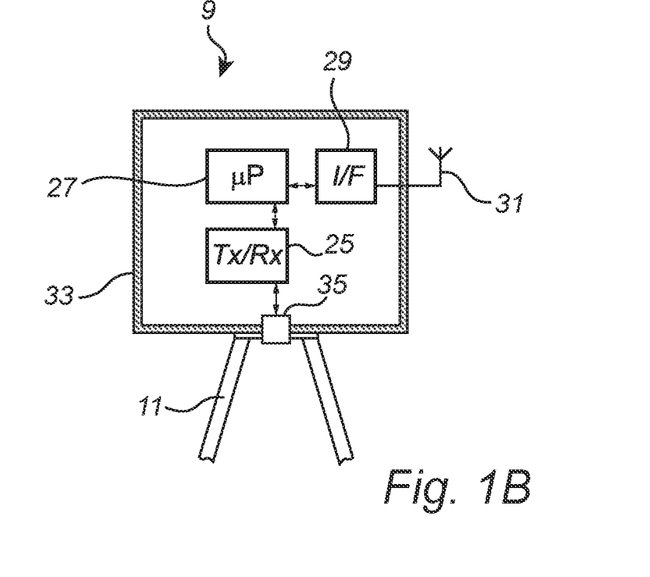
FIG. 1B is a schematic illustration of the radar level gauge system in FIG. 1A.

As is schematically illustrated in FIG. 1B, the measurement electronics unit 9 comprises a transceiver 25, processing circuitry 27, a communication interface 29, and a communication antenna 31 for wireless communication with, for example, a remote control room (not shown in FIGS. 1A-B). The transceiver 25, the processing circuitry 27, and the communication interface 29 are all illustrated as being enclosed in a measurement electronics unit housing 33.

The transceiver 25 is configured to generate, transmit and receive electromagnetic signals, and is coupled to the antenna 11 via a feed-through 35 through a wall of the tank 5. Various suitable feed-through configurations are, per se, known in the art, and the feed-through 35 is schematically indicated as a simple box in FIG. 1B.

The processing circuitry 27 is coupled to the transceiver 25 and is configured to determine the filling level L based on a timing relation between the reflection signal $S_R$ and the transmit signal $S_T$ as will be described in greater detail further below. The communication interface 29 is connected to the processing circuitry 27 and configured to allow external communication via the communication antenna 31. In the example embodiment of FIGS. 1A-B, the external communication of the radar level gauge system 3 is indicated as being wireless communication. Alternatively, communication may, for example, take place over an analog and/or digital wire-based communication channel. For instance, the communication channel may be a two-wire 4-20 mA loop and the filling level may be communicated by providing a certain current corresponding to the filling level on the two-wire 4-20 mA loop. Digital data may also be sent across such a 4-20 mA loop, using the HART protocol.

Moreover, although not shown in FIG. 1B, the radar level gauge system 3 may be connectable to an external power source, or may be powered through communication lines.

Figure 2:
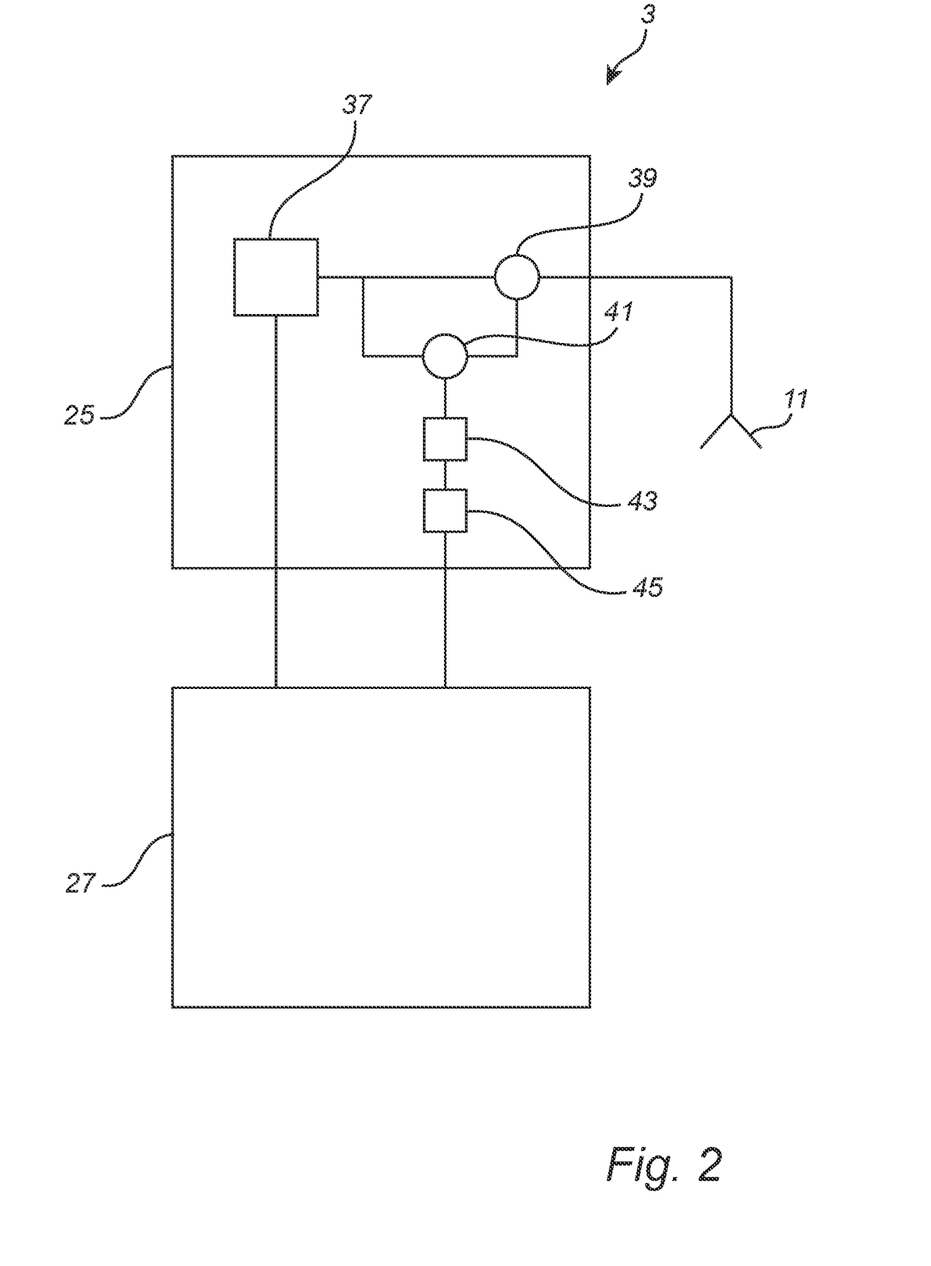
FIG. 2 is a partial schematic block diagram of the radar level gauge system in FIGS. 1A-B.

With further reference to FIG. 2, which is a partial schematic block diagram of an example configuration of the radar level gauge system 3 in FIGS. 1A-B, the transceiver 25 may include a microwave source 37 for generating the electromagnetic transmit signal $S_T$. The microwave source 37 may be controlled by a timer or timing circuitry (not shown) of the processing circuitry 27. As is schematically shown in FIG. 2, the microwave source 37 may be connected to the antenna 11 via a power divider 39, and also to a mixer 41. The power divider 39 is arranged to connect the electromagnetic reflection signal $S_R$ from the antenna 11 to the mixer 41, in order to allow the mixer 41 to mix the electromagnetic transmit signal $S_T$ from the microwave source 37 with the electromagnetic reflection signal $S_R$ and provide a mixer output signal indicative of a difference between the transmit signal $S_T$ and the reflection signal $S_R$. The mixer 41 may further optionally be connected to a band pass filter 43 and to an amplifier 45. The mixer output signal is provided to the processing circuitry 27, where the mixer output signal is sampled, and processed to form a measurement signal, which is used for further processing by the processing circuitry 27.

While the elements of the transceiver 25 may typically be implemented in hardware, and may form part of an integrated unit normally referred to as a microwave unit, at least some portions of the processing circuitry 27 may typically be embodied by software modules executed by an embedded processor. The invention is not restricted to this particular realization, and any implementation found suitable to realize the herein described functionality may be contemplated.

Figure 3:
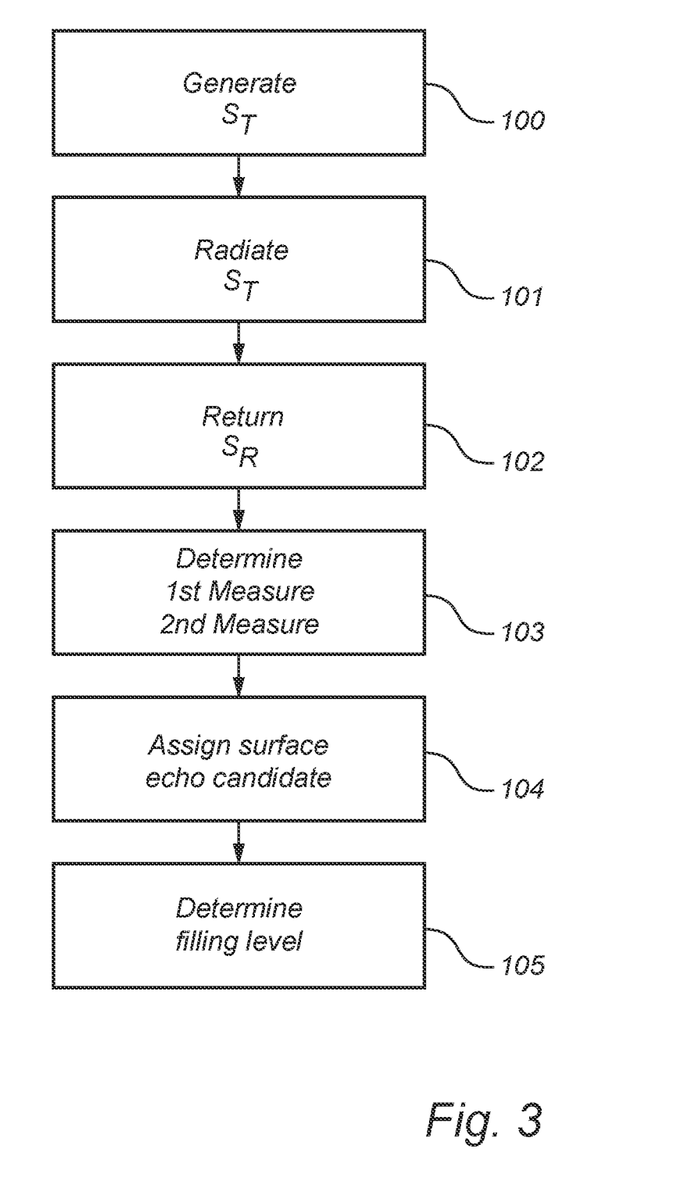
FIG. 3 is a flow-chart schematically illustrating a method according to an embodiment of the present invention.

Exemplary operation of the radar level gauge system 3 according to embodiments of the present invention will be described in greater detail further below with reference to the flow-chart in FIG. 3 and other illustrations as indicated.

Figure 4:
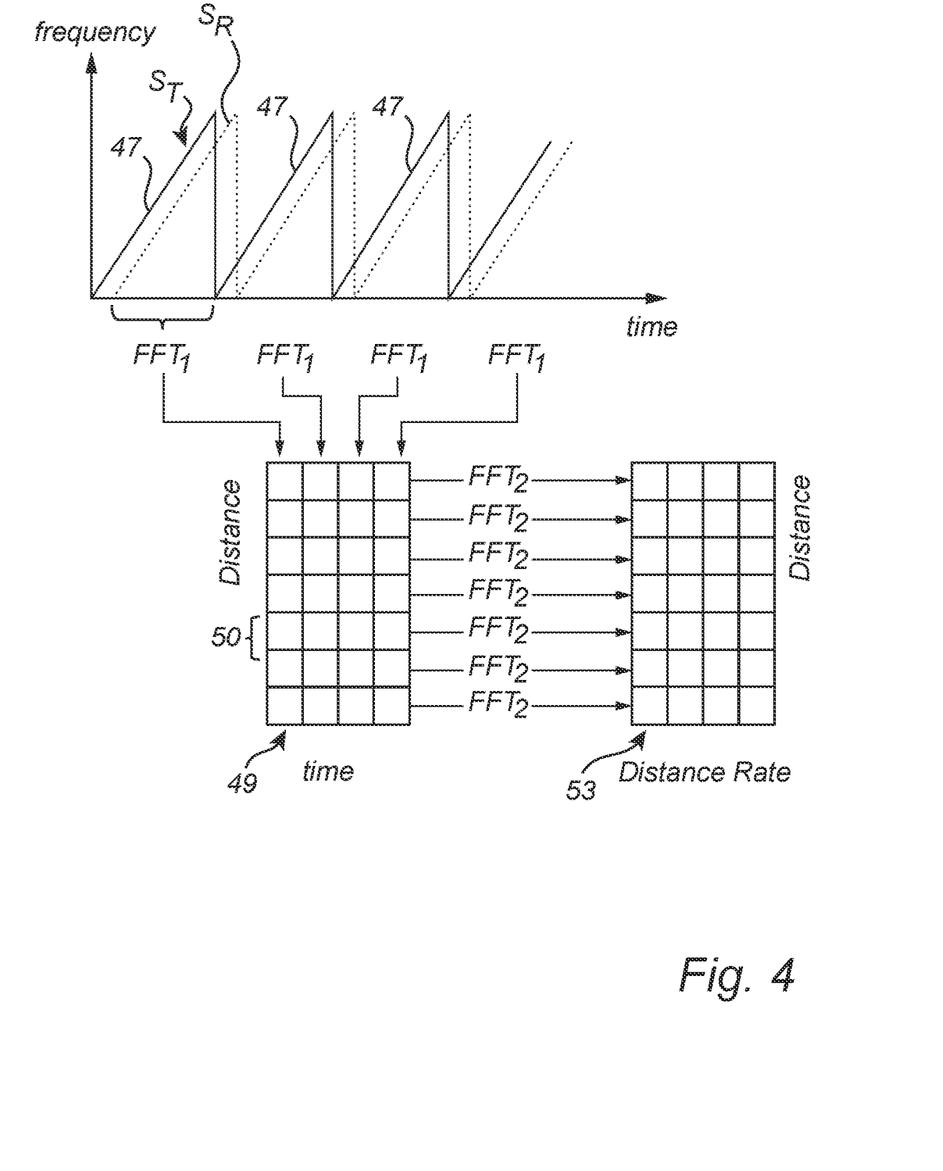
FIG. 4 schematically shows an electromagnetic transmit signal, an electromagnetic reflection signal, a distance-time matrix, and a distance-distance rate-of-change matrix determined in an embodiment of the method according to the present invention.

In a first step 100, an electromagnetic transmit signal $S_T$ is generated. With further reference to FIG. 4, the transmit signal $S_T$ may advantageously comprise a plurality of identical frequency sweeps 47. The electromagnetic transmit signal may for example be sawtooth-shaped (up-chirp). In FIG. 4, the frequency sweeps 47 occur immediately after each other. Alternatively, there may be a delay after each frequency sweep 47.

In the subsequent step 101, the transmit signal $S_T$ is radiated by the antenna 11 toward the product 7 in the tank 5.

An electromagnetic reflection signal $S_R$ resulting from reflection of the transmit signal $S_T$ at the surface 13 of the product 5 is returned by the antenna 11 to the transceiver 25 in step 102. As was mentioned further above, the transmit signal ST may additionally be reflected at other reflecting objects in the tank 5, such as the heater 15 and/or the support strut 23. Each such reflection can be represented by a surface echo candidate.

According to one example embodiment, the surface echo candidates can be obtained as follows. Referring to FIG. 2, the reflection signal $S_R$ is passed, via the power divider 39, to the mixer 41. In the mixer 41, the reflection signal $S_R$ is mixed with the transmit signal $S_T$. As is, per se, well-known, the output from the mixer 41—the mixer output—is indicative of a difference between the signals input to the mixer 41. In this case, the mixer output is thus indicative of the difference between the reflection signal $S_R$ and the transmit signal $S_T$. In the processing circuitry the mixer output may be sampled, to form a digital measurement signal $S_m$. The measurement signal $S_m$ contains information about each surface echo candidate.

In the subsequent step 103, the processing circuitry 27 determines a first measure and a second measure for each surface echo candidate based on the transmit signal $S_T$ and the reflection signal $S_R$. The first measure is indicative of a distance between the antenna 11 and a surface candidate corresponding to the surface echo candidate. The second measure is indicative of a rate-of-change distribution of the distance between the antenna 11 and the surface candidate corresponding to the surface echo candidate.

According to embodiments, the first measure and the second measure for each surface echo candidate may be determined based on the above-mentioned measurement signal $S_m$. In particular, the determination of the first measure and the second measure may involve determining a distance-distance rate matrix based on the measurement signal $S_m$. This will now be explained with continued reference to the illustration in FIG. 4.

Referring to FIG. 4, the processing circuitry 27 may perform a two-dimensional digital Fourier transformation on the measurement signal $S_m$. According to one example configuration, the processing circuitry 27 may perform a first Fast Fourier Transform FFT1 on the measurement signal $S_m$ for each frequency sweep 47 of the plurality of frequency sweeps 47 of the electromagnetic transmit signal ST. Each FFT1 results in a spectrum. The processing circuitry 27 stores the resulting consecutive spectra in a distance-time matrix 49, wherein each distance D may be a distance bin 51. Thereafter, the processing circuitry 27 may perform a second Fast Fourier Transform FFT2 for each distance (distance bin 51) in the distance-time matrix 49, resulting in a distance-distance rate matrix 53. This procedure is, per se, well known, and is sometimes referred to as Range-Doppler processing. The distance-distance rate matrix 53 may be referred to as a Range-Doppler matrix.

The first measure indicative of the distance between the antenna 11 and the surface candidate corresponding to the surface echo candidate may thus be determined based on the distance-distance rate matrix 53. Alternatively, the first measure may be determined directly from the distance-time matrix 49.

The second measure indicative of the rate-of-change distribution of the distance between the antenna 11 and the surface candidate corresponding to the surface echo candidate may be determined based on the distance-distance rate matrix 53.

Figure 5A:
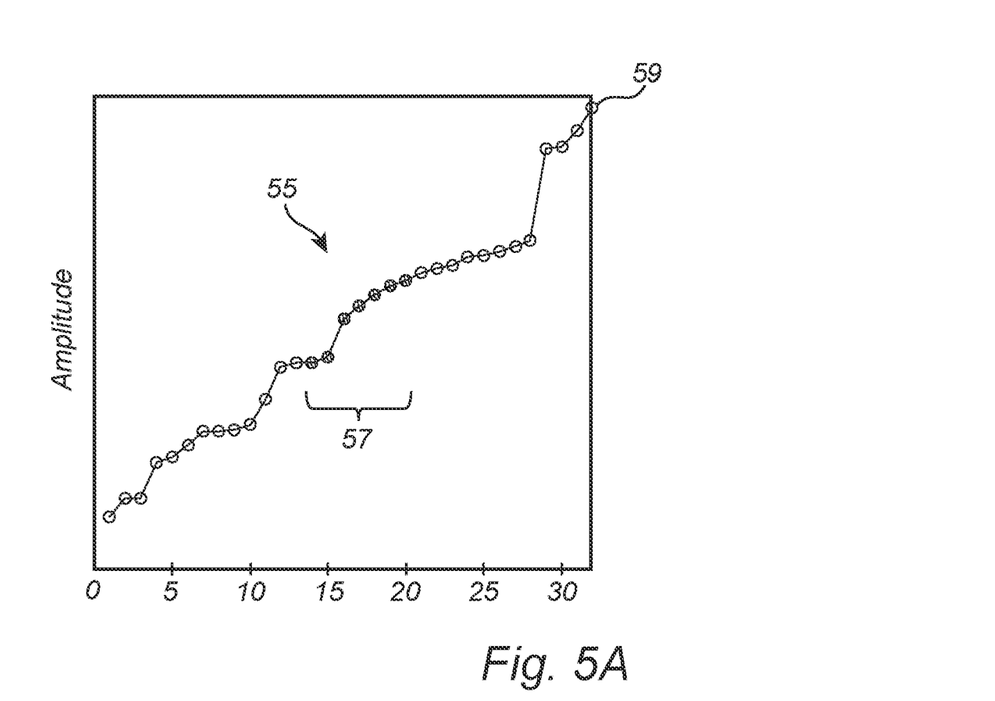
FIGS. 5A-B are schematic illustrations of how to determine one example of a measure of the rate-of-change distribution of the distance from the antenna, for a disturbed liquid product and for an undisturbed liquid product, respectively.
Figure 5B:
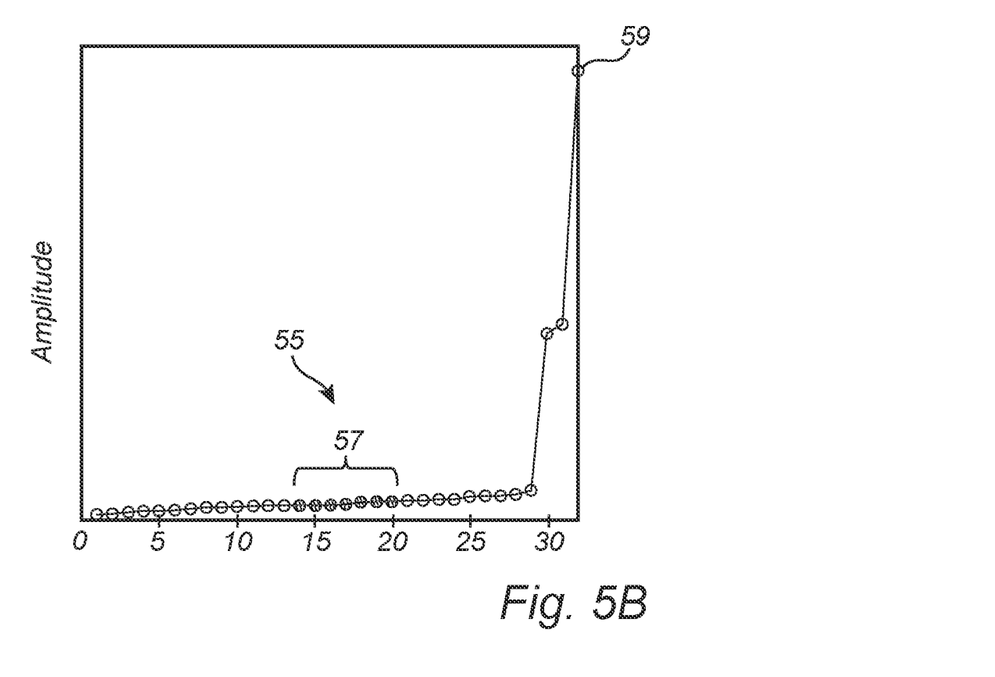

An example of such determination of the second measure will now be described with reference to FIGS. 5A-B. The diagrams in FIGS. 5A-B show the signal amplitude values in the distance bin, in the distance-distance rate matrix 53, of the surface echo candidate corresponding to the surface 13 of the product 7. The amplitudes have been sorted from lowest to highest, to form the curve 55. Among the sorted amplitude values, a subset 57 is centered around the median amplitude and includes a predetermined number of amplitude values. The second measure for the surface echo candidate can then be determined as the average value of the amplitude values in the subset 57 divided by the maximum amplitude value 59.

FIG. 5A illustrates a situation where the stirrer 17 in the tank 5 in FIG. 1A is activated, and the liquid product 7 in the tank 5 is disturbed. There is a substantial signal amplitude value for many different rates-of-change of the distance between the antenna 11 and the surface 13 of the product 7. As can be understood by studying the curve 55 in FIG. 5A, this will result in a relatively high value of the second measure for the surface echo candidate corresponding to the surface 13 of the product 7.

FIG. 5B illustrates a situation where the stirrer 17 in the tank 5 in FIG. 1A is deactivated, and the liquid product 7 in the tank 5 is not disturbed. There will therefore be a strong peak for a zero rate-of-change of the distance between the antenna 11 and the surface 13 of the product 7. As can be understood by studying the curve 55 in FIG. 5B, this will result in a relatively low value of the second measure for the surface echo candidate corresponding to the surface 13 of the product 7.

There are many other ways of determining a suitable second measure that are well within the capabilities of the skilled person. For instance, any statistical measure indicating a width of a distribution may be used, such as variance or standard deviation, etc.

In the next step 104, one surface echo candidate in the set of surface echo candidates is assigned as most likely to correspond to a single reflection of the transmit signal $S_T$ at the surface 13 of the product 7 in the tank 5, based on an evaluation of the second measure for each surface echo candidate in the set of surface echo candidates.

An example assignment of one surface echo candidate as most likely to correspond to single reflection of the transmit signal $S_T$ at the surface 13 of the product 7 in the tank 5 will now be described with additional reference to FIGS. 6A-B.

Figure 6A:
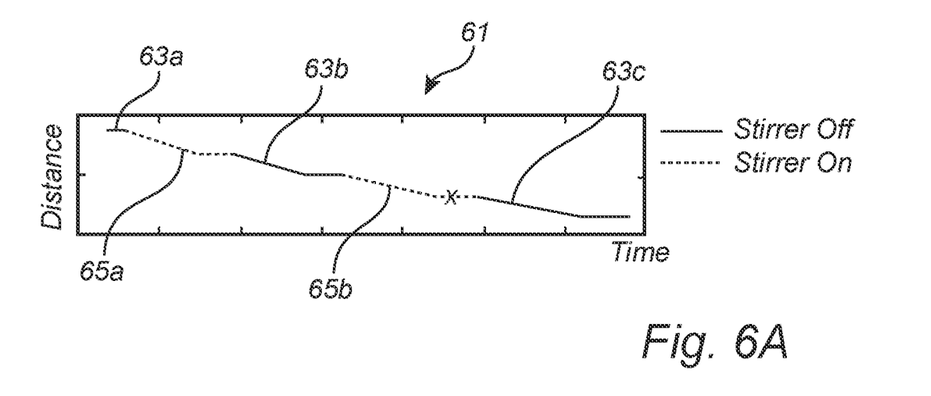
FIG. 6A is a diagram schematically illustrating an exemplary development over time of the state of the product in the tank in FIG. 1A.

FIG. 6A is a diagram schematically illustrating an exemplary development over time of the distance between the antenna 11 and the surface 13 of the product 7 in the tank 5 in FIG. 1A, for a tank filling event during which the stirrer 17 is sometimes deactivated and sometimes activated.

As can be understood from the diagram 61 in FIG. 6A, the tank filling event starts at a relatively long distance, that is, a relatively low filling level. Filling of product then takes place at filling time periods that are characterized by a decreasing distance. The filling time periods are separated by idle time periods that are characterized by a constant distance. The stirrer 17 is inactive during time periods indicated by the solid line segments 63a-c in FIG. 6A, and the stirrer is active during time periods indicated by the dashed line segments 65a-b.

In the example illustrated in FIG. 6A, the point in time where the filling level determination is carried out is indicated by the letter 'x' on the second dashed line segment 65b. Accordingly, the filling level determination is carried out while the stirrer 17 is activated.

Figure 6B:
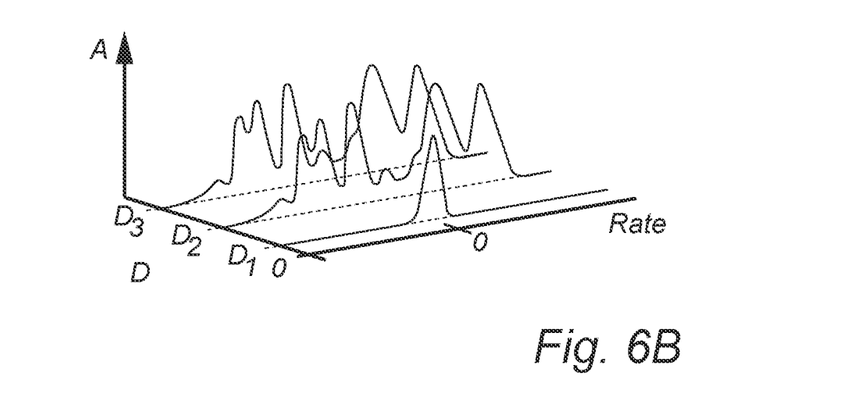
FIG. 6B is a diagram schematically showing the distance from the antenna and the rate-of-change distribution of the distance from the antenna for three exemplary surface echo candidates.

FIG. 6B is a diagram schematically showing the distance from the antenna and the rate-of-change distribution of the distance from the antenna for three exemplary surface echo candidates. A first surface echo candidate corresponds to reflection of the transmit signal $S_T$ at a first surface candidate at a first distance $D_1$, a second surface echo candidate corresponds to reflection of the transmit signal $S_T$ at a second surface candidate at a second distance $D_2$, and a third surface echo candidate corresponds to reflection of the transmit signal $S_T$ at a third surface candidate at a third distance $D_3$. In this example, the first surface candidate is the strut 23 supporting the axle 21 of the stirrer 17, the second surface candidate is the surface 13 of the product 7, and the third surface candidate is also the surface 13 of the product, but following reflection at the antenna 11, and a second reflection at the surface 13 of the product 7, a so-called double reflection.

From the diagram in FIG. 6B, which is one visual representation of the distance-distance rate matrix 53 in FIG. 4, it can be seen that the rate-of-change distribution of the first surface echo candidate (at the first distance $D_1$) is relatively narrow, while the rate-of-change distributions of the second surface echo candidate (at the second distance $D_2$) and the third surface echo candidate (at the third distance $D_3$) are relatively wide.

When assigning one of the three surface echo candidates as most likely to correspond to single reflection of the transmit signal $S_T$ at the surface 13 of the product 7, the second measure of each of the surface echo candidates may be compared with a predefined threshold measure indicating a threshold width of the rate-of-change distribution of the distance. The second measure may, for example, be determined in accordance with the procedure described above with reference to FIGS. 5A-B, and the predefined threshold measure may be selected to distinguish between a case when the liquid product 7 is disturbed—for example by the stirrer 17 being activated—and a case when the liquid product 7 is not disturbed.

In the example situation of FIGS. 6A-B, the stirrer 17 is activated and the liquid product 7 is thus disturbed. This means that the second measure of the second surface echo candidate (at the second distance $D_2$) and the second measure of the third surface echo candidate (at the third distance $D_3$) will indicate a width of the rate-of-change distribution being greater than the threshold width indicated by the predefined threshold measure. Since the first surface echo candidate results from reflection of the transmit signal $S_T$ at a stationary object (the strut 23), the second measure of the first surface echo candidate (at the first distance $D_1$) will not indicate a width of the rate-of-change distribution being greater than the threshold width indicated by the predefined threshold measure.

It is therefore concluded that the first surface echo candidate is unlikely to correspond to reflection at the surface 13, and the first surface echo candidate is discarded. The second echo candidate may be assigned as most likely to correspond to single reflection at the surface 13 because it is the disturbed surface closest to the antenna 11. Alternatively, or in combination, the second distance $D_2$ and the third distance $D_3$ may be compared, and if it can be determined that the third distance $D_3$ is an integer multiple of the second distance $D_2$, the third surface echo candidate can be identified as resulting from a double (or triple) reflection, and the assignment of the second surface echo candidate as most likely to correspond to single reflection at the surface 13 can be considered to be more reliable.

It should be noted that embodiments of the method according to the present invention may mainly be used when it can be determined that the liquid product 7 in the tank 5 is disturbed. Alternatively, or in combination, the method may include the step of inducing a disturbance, such as by operating the stirrer 17 while the method is being carried out. In either case, identification of the surface echo candidate resulting from single reflection at the surface 13 of the product 7 may simplify tracking of this surface echo candidate also at times when there is no disturbance of the product 7.

Finally, in step 105, the filling level L is determined based on the first measure for the surface echo candidate assigned as most likely to correspond to reflection of the transmit signal at the surface of the product.

The person skilled in the art realizes that the present invention by no means is limited to the preferred embodiments described above. On the contrary, many modifications and variations are possible within the scope of the appended claims. For example, the antenna need not be a horn antenna as indicated in the drawings, but various other types of radiating antennas may be used. Examples of such types radiating antennas are horn antennas, parabolic antennas, rod antennas, patch antennas etc.

What is claimed is:

1. A method of determining a filling level of a product in a tank using a radar level gauge system comprising a transceiver, an antenna, and processing circuitry, the method comprising the steps of:
   generating and transmitting, by the transceiver, an electromagnetic transmit signal;
   radiating, by the antenna, the transmit signal towards the product in the tank;
   returning, by the antenna, an electromagnetic reflection signal resulting from reflection of the transmit signal back towards the transceiver;
   determining, by the processing circuitry, based on the transmit signal and the reflection signal, for each surface echo candidate in a set of surface echo candidates, a first measure for the surface echo candidate indicative of a distance between the antenna and a surface candidate corresponding to the surface echo candidate and a second measure for the surface echo candidate indicating a rate-of-change distribution of the distance between the antenna and the surface candidate corresponding to the surface echo candidate;
   assigning one surface echo candidate in the set of surface echo candidates as most likely to correspond to single reflection of the transmit signal at the surface of the product, based on an evaluation of the second measure for each surface echo candidate in the set of surface echo candidates; and
   determining the filling level based on the first measure for the surface echo candidate assigned as most likely to correspond to reflection of the transmit signal at the surface of the product,
   wherein the step of assigning comprises the steps of:
   comparing the second measure for each surface echo candidate in the set of surface echo candidates with a predefined threshold measure indicating a threshold width of the rate-of-change distribution of the distance; and
   assigning, when the second measure for each surface echo candidate in a subset of the surface echo candidates indicates a width of the rate-of-change distribution being greater than the threshold width, one of the surface echo candidates in the subset as the surface echo candidate most likely to correspond to single reflection of the transmit signal at the surface of the product.

2. The method according to claim 1, wherein the step of assigning comprises the steps of:
   evaluating the first measure for each surface echo candidate in the subset of surface echo candidates; and
   assigning, when the first measure for a first surface echo candidate in the subset and the first measure for a second surface echo candidate in the subset indicate that the distance between the antenna and a first surface candidate corresponding to the first surface echo candidate is an integer multiple of the distance between the antenna and a second surface candidate corresponding to the second surface echo candidate, the second surface echo candidate as the surface echo candidate most likely to correspond to single reflection of the transmit signal at the surface of the product.

3. The method according to claim 1, wherein the step of determining the first measure and the second measure for each surface echo candidate in the set of surface echo candidates comprises the steps of:
   determining a measurement signal indicative of a difference between the reflection signal and the transmit signal;
   determining the first measure for each surface echo candidate based on the measurement signal; and
   determining the second measure for each surface echo candidate based on the measurement signal.

4. The method according to claim 3, wherein the measurement signal is determined by mixing the reflection signal and the transmit signal.

5. The method according to claim 3, wherein:
the step of determining the first measure and the second measure for each surface echo candidate further comprises the step of determining a distance-distance rate matrix based on the measurement signal; and
the first measure and the second measure for each surface echo candidate is determined based on the distance-distance rate matrix.

6. The method according to claim 5, wherein the distance-distance rate matrix is determined by performing two-dimensional digital fourier transformation on the measurement signal.

7. The method according to claim 1, further comprising the step of:
receiving a signal indicative of an ongoing disturbance of the product in the tank; and
carrying out the steps of claim 1 in response to receiving the signal.

8. A radar level gauge system, for determining a filling level of a product in a tank, the radar level gauge system comprising:
a transceiver for generating, transmitting, and receiving electromagnetic signals;
an antenna coupled to the transceiver and configured to radiate an electromagnetic transmit signal from the transceiver towards the product in the tank, and return an electromagnetic reflection signal resulting from reflection of the transmit signal back towards the transceiver; and
processing circuitry coupled to the transceiver for determining the filling level based on a timing relation between the reflection signal and the transmit signal, the processing circuitry being configured to:
determine, based on the transmit signal and the reflection signal, for each surface echo candidate in a set of surface echo candidates, a first measure for the surface echo candidate indicative of a distance between the antenna and a surface candidate corresponding to the surface echo candidate and a second measure for the surface echo candidate indicating a rate-of-change distribution of the distance between the antenna and the surface candidate corresponding to the surface echo candidate;
assign one surface echo candidate in the set of surface echo candidates as most likely to correspond to single reflection of the transmit signal at the surface of the product, based on an evaluation of the second measure for each surface echo candidate in the set of surface echo candidates; and
determine the filling level based on the first measure for the surface echo candidate assigned as most likely to correspond to reflection of the transmit signal at the surface of the product,
wherein the processing circuitry is configured to:
compare the second measure for each surface echo candidate in the set of surface echo candidates with a predefined threshold measure indicating a threshold width of the rate-of-change distribution of the distance; and
assign, when the second measure for each surface echo candidate in a subset of the surface echo candidates indicates a width of the rate-of-change distribution being greater than the threshold width, one of the surface echo candidates in the subset as the surface echo candidate most likely to correspond to single reflection of the transmit signal at the surface of the product.

9. The radar level gauge system according to claim 8, wherein the processing circuitry is configured to:
evaluate the first measure for each surface echo candidate in the subset of surface echo candidates; and
assign, when the first measure for a first surface echo candidate in the subset and the first measure for a second surface echo candidate in the subset indicate that the distance between the antenna and a first surface candidate corresponding to the first surface echo candidate is an integer multiple of the distance between the antenna and a second surface candidate corresponding to the second surface echo candidate, the second surface echo candidate as the surface echo candidate most likely to correspond to single reflection of the transmit signal at the surface of the product.

10. The radar level gauge system according to claim 8, wherein the processing circuitry is configured to:
determine a measurement signal indicative of a difference between the reflection signal and the transmit signal;
determine the first measure for each surface echo candidate based on the measurement signal; and
determine the second measure for each surface echo candidate based on the measurement signal.

11. The radar level gauge system according to claim 10, wherein:
the transceiver further comprises a mixer having a first input for receiving the reflection signal, a second input for receiving the transmit signal, and an output for providing a mixer output signal indicative of a difference between the reflection signal and the transmit signal; and
the processing circuitry is configured to determine the measurement signal based on the mixer output signal.

12. The radar level gauge system according to claim 10, wherein the processing circuitry is configured to:
determine a distance-distance rate matrix based on the measurement signal; and
determine the first measure and the second measure for each surface echo candidate based on the distance-distance rate matrix.

13. The radar level gauge system according to claim 12, wherein the processing circuitry is configured to:
determine the distance-distance rate matrix by performing two-dimensional digital fourier transformation on the measurement signal.

* * * * *